(12) United States Patent
Han et al.

(10) Patent No.: US 12,456,074 B2
(45) Date of Patent: Oct. 28, 2025

(54) INCREMENTAL MACHINE LEARNING FOR A PARAMETRIC MACHINE LEARNING MODEL

(71) Applicant: International Business Machines Corporation, Armonk, NY (US)

(72) Inventors: Si Er Han, Xian (CN); Ji Hui Yang, Beijing (CN); Xiao Ming Ma, Xian (CN); Jing Xu, Xian (CN); Xue Ying Zhang, Xian (CN)

(73) Assignee: International Business Machines Corporation, Armonk, NY (US)

( * ) Notice: Subject to any disclaimer, the term of this patent is extended or adjusted under 35 U.S.C. 154(b) by 1029 days.

(21) Appl. No.: 17/453,540

(22) Filed: Nov. 4, 2021

(65) Prior Publication Data

US 2023/0137184 A1    May 4, 2023

(51) Int. Cl.
 *G06N 20/00* (2019.01)
 *G06F 18/20* (2023.01)
 *G06F 18/21* (2023.01)
 *G06F 18/232* (2023.01)

(52) U.S. Cl.
 CPC .......... *G06N 20/00* (2019.01); *G06F 18/217* (2023.01); *G06F 18/232* (2023.01); *G06F 18/285* (2023.01)

(58) Field of Classification Search
 CPC ................................ G06N 20/00; G06N 3/09
 See application file for complete search history.

(56) References Cited

U.S. PATENT DOCUMENTS

| | | |
|---|---|---|
| 2019/0102693 A1 | 4/2019 | Yates |
| 2020/0175384 A1 | 6/2020 | Zhang |
| 2020/0382385 A1* | 12/2020 | Vasseur ............... H04L 41/0896 |

(Continued)

FOREIGN PATENT DOCUMENTS

| | | |
|---|---|---|
| CN | 111027487 A | 4/2020 |
| WO | 2012151198 A1 | 11/2012 |

(Continued)

OTHER PUBLICATIONS

International Search Report and Written Opinion for Application PCT/CN2022/120690, Nov. 28, 2022, 5 pages.

(Continued)

*Primary Examiner* — Grace Park
(74) *Attorney, Agent, or Firm* — Heather Schuler

(57) ABSTRACT

A method, system, and computer program product for incremental machine learning for a parametric machine learning model are disclosed. The method may include processing samples comprising historical samples and new samples with an existing parametric machine learning model to obtain at least one prediction residual of each of the samples, wherein the existing parametric machine learning model was trained based on the historical samples. The method may further include clustering the samples based on the at least one prediction residual of each of the samples and features of each of the samples. The method may further include sampling samples in each cluster to ensure that each cluster includes substantially similar number of sampled samples. The method may further include updating the existing parametric machine learning model to obtain an updated parametric machine learning model based on sampled samples in each cluster.

20 Claims, 7 Drawing Sheets

(56) References Cited

U.S. PATENT DOCUMENTS

| | | | |
|---|---|---|---|
| 2021/0027169 A1 | 1/2021 | Kanan | |
| 2022/0414539 A1* | 12/2022 | Oren | G06F 11/3447 |
| 2023/0011893 A1* | 1/2023 | Mukherjee | H04N 19/42 |

FOREIGN PATENT DOCUMENTS

| | | |
|---|---|---|
| WO | 2021105927 A1 | 6/2021 |
| WO | 2021160933 A1 | 8/2021 |

OTHER PUBLICATIONS

D'Alche-Buc et al., "Incremental Learning Algorithms for Classification and Regression: local strategies," Computer Science, Aug. 2002, 9 pages. <https://www.researchgate.net/publication/234482772_Incremental_Learning_Algorithms_for_Classification_and_Regression_local_strategies>.

Engelbrecht et al., "A clustering approach to incremental learning for feedforward neural networks," International Joint Conference on Neural Networks (IJCNN '01), Jul. 15-19, 2001, 6 pages. <https://www.researchgate.net/publication/3907041>.

Gepperth et al., "Incremental learning algorithms and applications," HAL archives-ouvertes, Dec. 16, 2016, 13 pages. <https://hal.archives-ouvertes.fr/hal-01418129/document>.

Li et al., "A new dual weights optimization incremental learning algorithm for time series forecasting," Applied Intelligence, May 1, 2019, 26 pages. <https://link.springer.com/article/10.1007%2Fs10489-019-01471-y>.

Li et al., "SupportNet: a novel incremental learning framework through deep learning and support data," bioRxiv, May 8, 2018, https://doi.org/10.1101/317578, 9 pages. <https://www.biorxiv.org/content/10.1101/317578v1.full>.

Luo et al., "An Appraisal of Incremental Learning Methods," Entropy 2020, 22, 1190, Oct. 22, 2020, 27 pages. <https://www.mdpi.com/1099-4300/22/11/1190/pdf>.

Madhusudhanan et al., "Incremental Learning for Classification of Unstructured Data Using Extreme Learning Machine," Algorithms 2018, 11(10), 158, Oct. 17, 2018, 19 pages. <https://www.mdpi.com/1999-4893/11/10/158>.

Mell et al., "The NIST Definition of Cloud Computing," Recommendations of the National Institute of Standards and Technology, U.S. Department of Commerce, Special Publication 800-145, Sep. 2011, 7 pages.

Pesala et al., "Incremental Learning of SVM Using Backward Elimination and Forward Selection of Support Vectors," 2019 International Conference on Applied Machine Learning (ICAML), May 2019, 6 pages. <https://www.researchgate.net/publication/339170324_>.

Wang, "An Incremental Learning Strategy for Support Vector Regression," Neural Processing Letters (2005) Jun. 21, 2005, pp. 175-188. <https://link.springer.com/article/10.1007/s11063-004-5714-1>.

Wu et al., "Large Scale Incremental Learning," Computer Vision Foundation, 2019, pp. 374-382. <https://openaccess.thecvf.com/content_CVPR_2019/papers/Wu_Large_Scale_Incremental_Learning_CVPR_2019_paper.pdf>.

* cited by examiner

INCREMENTAL MACHINE LEARNING FOR A PARAMETRIC MACHINE LEARNING MODEL

BACKGROUND

The present disclosure relates to machine learning, and more specifically, to methods, systems, and computer program products for incremental machine learning for a parametric machine learning model.

Machine learning is the science of getting computers to act without being explicitly programmed. In other words, machine learning is a method of data analysis that automates analytical model building. Machine learning is a branch of artificial intelligence based on the idea that computer systems can learn from data, identify patterns, and make decisions with minimal human intervention.

Most of machine learning uses supervised learning. Supervised learning is the task of learning a function that maps an input to an output based on example input-output pairs. Supervised learning infers a function, referred to as a machine learning model therein, from labeled training data consisting of a set of training examples, referred to as training samples therein. Each sample is a pair consisting of input values of features, which is typically a vector, and a value of output variable which can be continuous variable or categorial variable.

A supervised learning algorithm analyzes the training samples and produces a machine learning model, which can be used for mapping new samples to correctly determine the output values for unseen data. The algorithm for producing the machine learning model is learning from training samples, which can be thought of as a teacher. The algorithm iteratively makes predictions on the training data set and is corrected by the teacher. Learning stops when the algorithm achieves an acceptable level of performance.

BRIEF SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to a first aspect of the present disclosure, there is provided a computer-implemented method. The method may include processing samples comprising historical samples and new samples with an existing parametric machine learning model to obtain at least one prediction residual of each of the samples, wherein the existing parametric machine learning model was trained based on the historical samples. The method may further include clustering the samples based on the at least one prediction residual of each of the samples and features of each of the samples. The method may further include sampling samples in each cluster to ensure that each cluster includes substantially similar number of sampled samples. The method may further include updating the existing parametric machine learning model to obtain an updated parametric machine learning model based on sampled samples in each cluster.

According to a second aspect of the present disclosure, there is provided a system. The system comprises a first component with at least one processing unit in a cloud computing environment and a memory coupled to the at least one processing unit and storing instructions thereon. The instructions, when executed by the processing unit, perform actions of the above method.

According to a third aspect of the present disclosure, there is provided a computer program product comprising a computer-readable storage medium having program instructions embodied therewith. The program instructions are executable by a first component with at least one processing unit in a cloud computing environment to cause the at least one processing unit to perform actions of the above method.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure. The various features of the drawings are not to scale as the illustrations are for clarity in facilitating one skilled in the art in understanding the disclosure in conjunction with the detailed description. The drawings are discussed forthwith below.

DETAILED DESCRIPTION

Figure 1:
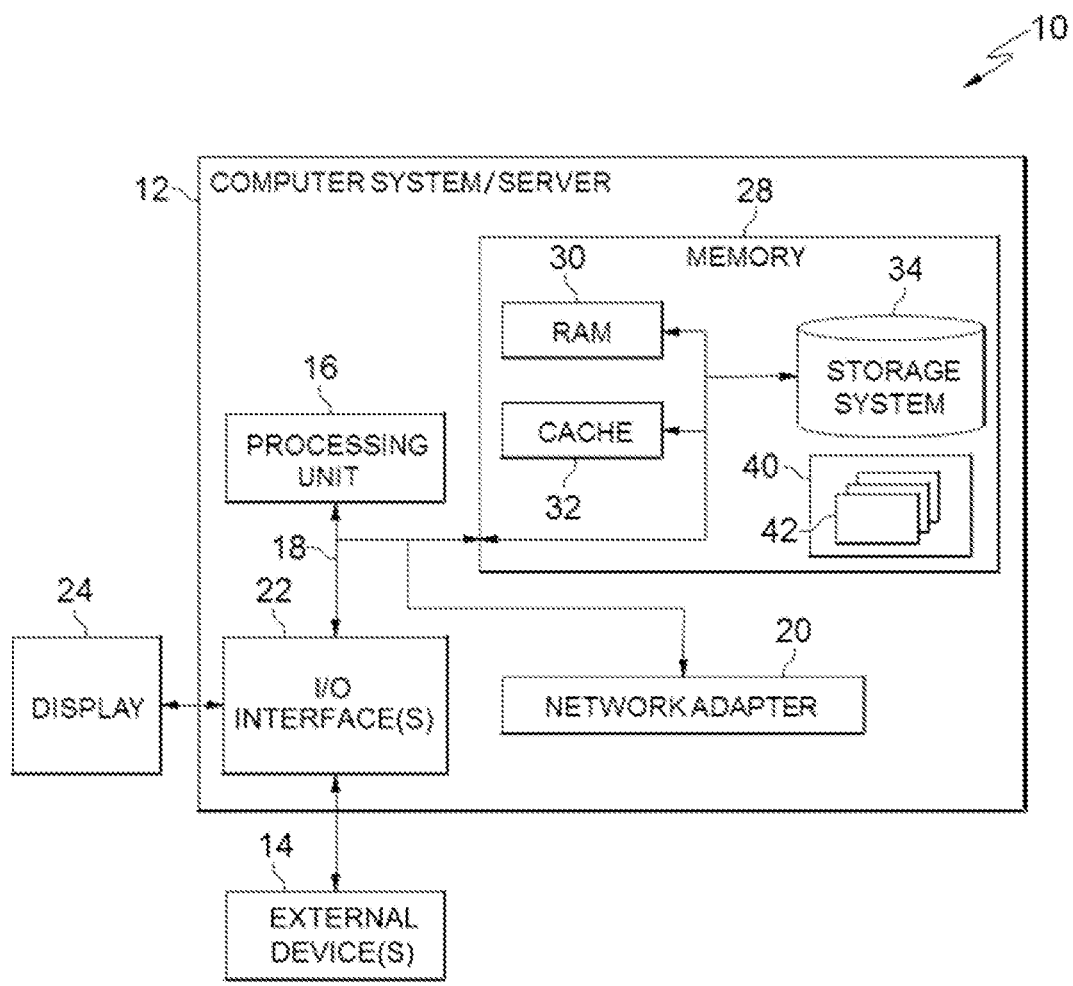
FIG. 1 depicts a cloud computing node according to some embodiments of the present disclosure.

The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

In the following, reference is made to various embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments may achieve advantages over other possible solutions and/or over the prior art, whether or not a particular advantage is achieved by a given embodiment is not limiting. Thus, the following aspects, features, embodiments, and advantages are merely illustrative and are not considered elements or limitations of the appended claims except where explicitly recited in a claim(s).

The terms and words used in the following description and claims are not limited to the bibliographical meanings, but are merely used to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
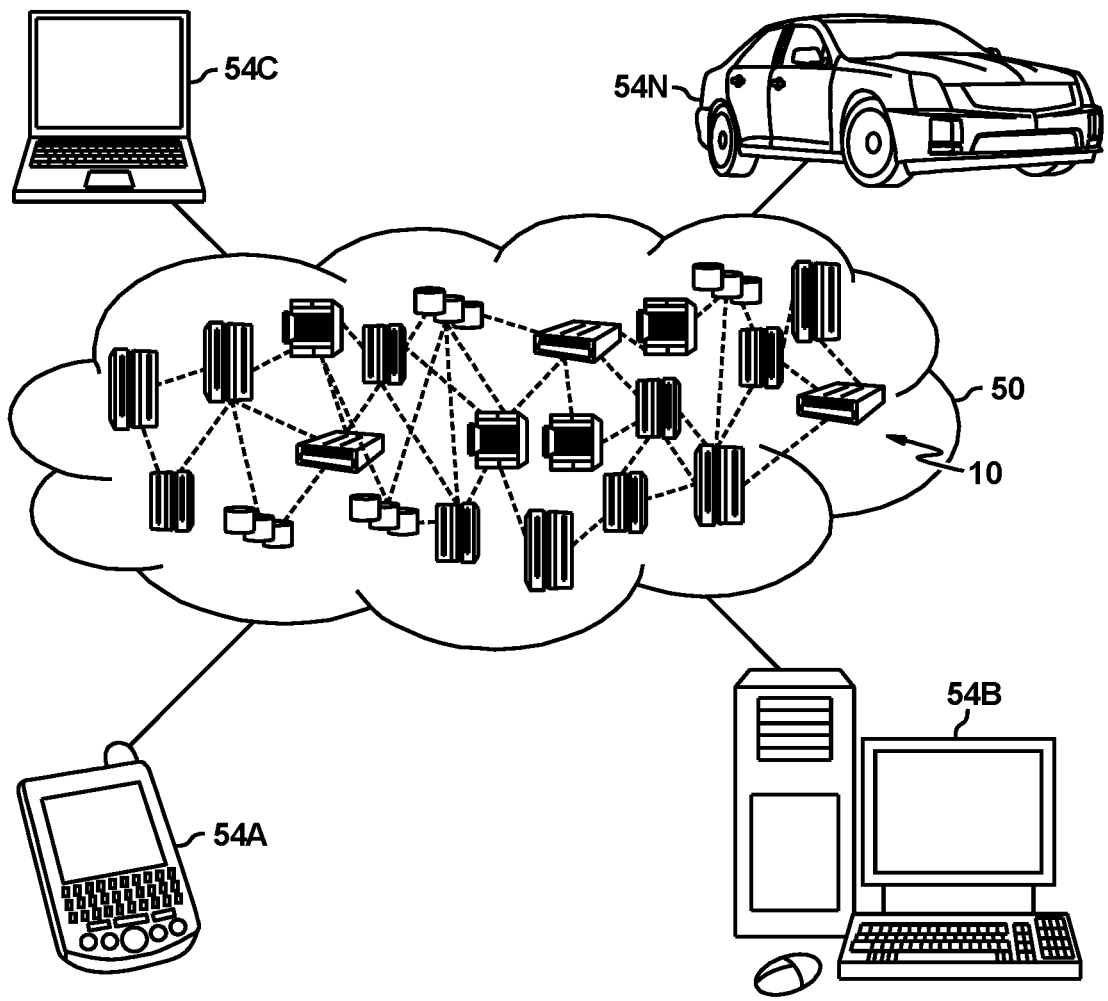
FIG. 2 depicts a cloud computing environment according to some embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
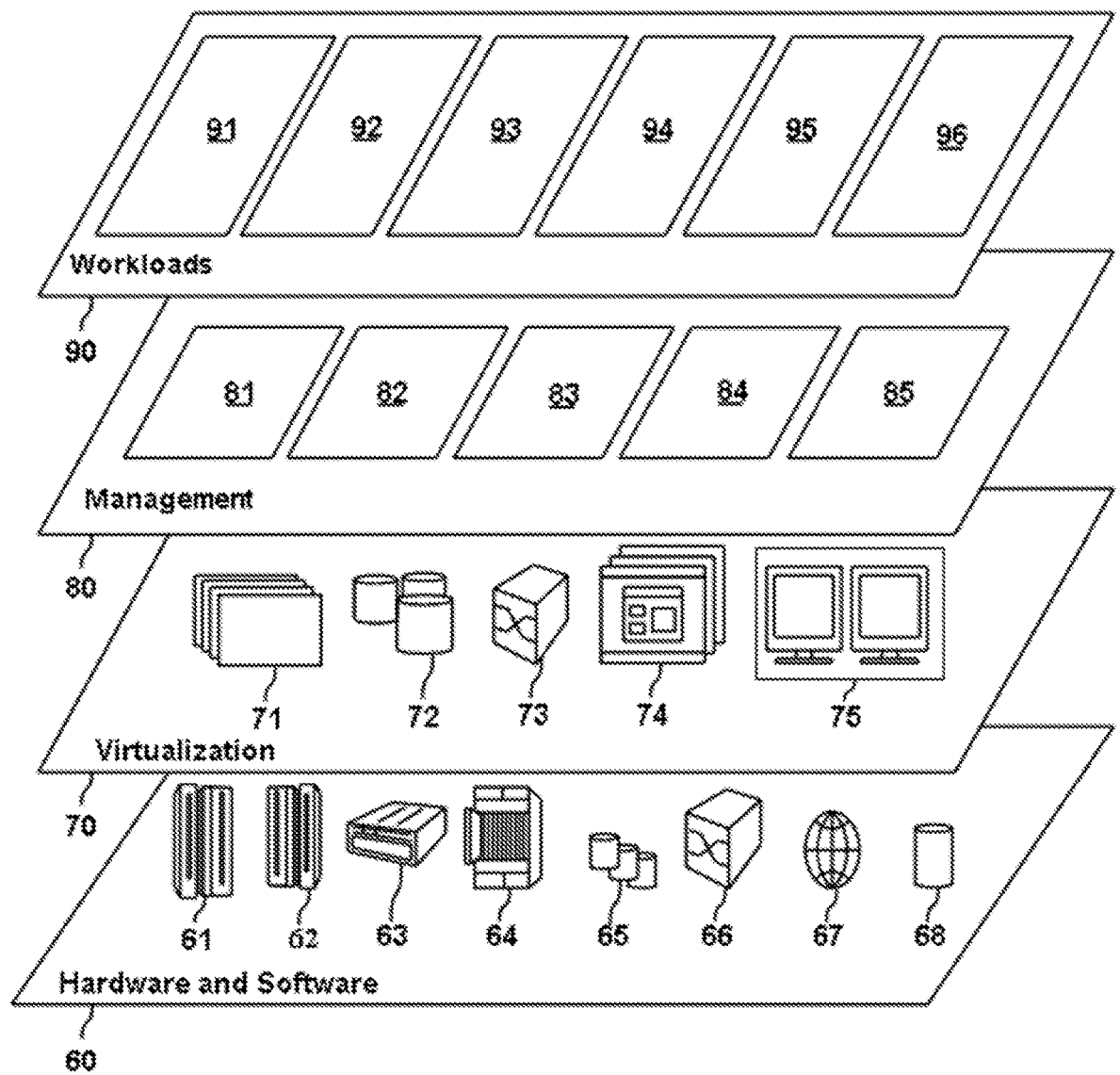
FIG. 3 depicts abstraction model layers according to some embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and incremental machine learning 96.

In machine learning, given historical training samples, each being a pair consisting of a set of values of input features and a value of an output variable, a machine learning model (model in short) can be built based on the historical training samples to represent the relationship between the set of input features and the corresponding output variable. For a new sample, which only contains a set of values of input features, the model can be used to predict a corresponding value of output variable for the new sample.

In some situations, over time, an existing model trained with historical samples can no longer be used to correctly predict values of output variables for new samples. It is needed to re-train the existing model to obtain a new model. This process is called incremental learning. There are two ways for incremental learning: one is to use the historical samples and the new samples to re-train the existing model to obtain the new model; the other is to use only the new samples to re-train the existing model to obtain the new model.

However, when the number of the new samples is not sufficient, it is difficult to get a new model with good quality. The reason is that if the historical samples and the new samples are combined to re-train the existing model, the patterns in the historical samples will dominate the new model, and the new model will not have a good performance for the new samples. On the other hand, if only the new samples are used to re-train the existing model, the new model may overfit the historical samples.

This disclosure proposes a method in which samples are selected from the historical samples and the new samples for incremental machine learning to ensure that an updated parametric machine learning model achieves a good prediction accuracy for new samples while keeps an acceptable level of prediction accuracy for the historical samples.

Table 1 shows an example data set including historical samples and new samples. The data set is two-dimensional. Each row is a record of a sample. A column "ID" represents an identification of a sample. Each of columns "X1", "X2", . . . , "Xn" represents a feature, and a vector {X1, X2, . . . , Xn} represents the input features. A column "Y" represents a corresponding output variable, which is categorical variable in this example, where "1" in the column Y represents that a corresponding sample belongs to a category "A" while "0" in the column "Y" represents that a corresponding sample belongs to a category of "B". A column "New sample?" represents whether a sample is a historical sample or a new sample. For example, value "N" in the column "New sample?" represents that a corresponding sample is a historical sample while value "Y" in the column "New sample?" represents that a corresponding sample is a new sample.

TABLE 1

| ID | X1 | X2 | ... | Xn | Y | New sample? |
|---|---|---|---|---|---|---|
| 1 | 0.3 | 0.7 | ... | 0.2 | 1 | N |
| 2 | 0.5 | 0.2 | ... | 0.6 | 0 | N |
| 3 | 0.4 | 0.3 |  | 0.5 | 1 | N |
| 4 | 0.2 | 0.6 |  | 0.7 | 1 | N |
| 5 | 0.8 | 0.4 |  | 0.6 | 1 | N |
| ... | ... | ... | ... | ... | ... | ... |
| N | 0.9 | 0.5 | ... | 0.7 | 0 | Y |

A parametric machine learning model (parametric model in short) means a model can be represented as some parameters which can be iteratively estimated using optimization method such as gradient descent. The parametric model may be, but not limited to, a linear regression model, a generalized linear model, a logistic regression model, a linear discriminant analysis model, a perceptron model, a naive Bayes model, a deep learning model, and the like.

If an output variable is a categorical variable, a value of the categorical variable may be defined as a one-hot-encode value of each category during training a parametric model. If the output variable is a continuous variable, the value of the output variable may be used directly during training the parametric model. After the parametric model is built, if the output variable is the categorical variable, a prediction probability value of each category for a sample can be obtained using the parametric model. Then a prediction residual of the sample for a category can be obtained by subtracting the prediction probability value of the sample for the category from the one-hot-encode value of the sample for the category. In addition, if the output variable is the continuous variable, a prediction value for a sample can be obtained using the parametric model. Then a prediction residual of the sample can be obtained by subtracting the prediction value of the sample from the value of the output variable of the sample.

Take the categorical variable as the output variable as an example. If the output variable takes two categories "A" and "B" and if a value of the output variable for a sample is "A", a one-hot-encode value of the category "A" for the sample may be defined as "1". And another one-hot-encode value of the category "B" for the sample may be defined as "0". Table 2 shows example prediction residuals of some samples. In Table 2, each row represents a record of a sample. A column "ID" represents an identification of a sample. A column "Y_A" represents a one-hot-encode value for the category "A". A column "Y_B" represents a one-hot-encode value for the category "B". A column "P_A" represents a predicting value for the category "A" with a model. A column "P_B" represents a predicting value for the category "B" with the model. A column "R_A" represents a prediction residual of a sample for the category "A". A column "R_B" represents a prediction residual of a sample for the category "B". A column "Category" represents a labeled category of a sample. As indicated in Table 2, if prediction probability values for a sample obtained from the parametric model are 0.85 and 0.15 for category "A" and "B" respectively, then the residual of the sample for the category "A" is 1−0.85=0.15, and the residual of the sample for the category "B" is 0−0.15=−0.15.

TABLE 2

| ID | Y_A | Y_B | P_A | P_B | R_A | R_B | Category |
|---|---|---|---|---|---|---|---|
| 1 | 1 | 0 | 0.85 | 0.15 | 0.15 | −0.15 | A |
| 2 | 0 | 1 | 0.45 | 0.55 | −0.45 | 0.45 | B |
| 3 | 1 | 0 | 0.65 | 0.35 | 0.35 | −0.35 | A |

Figure 4:
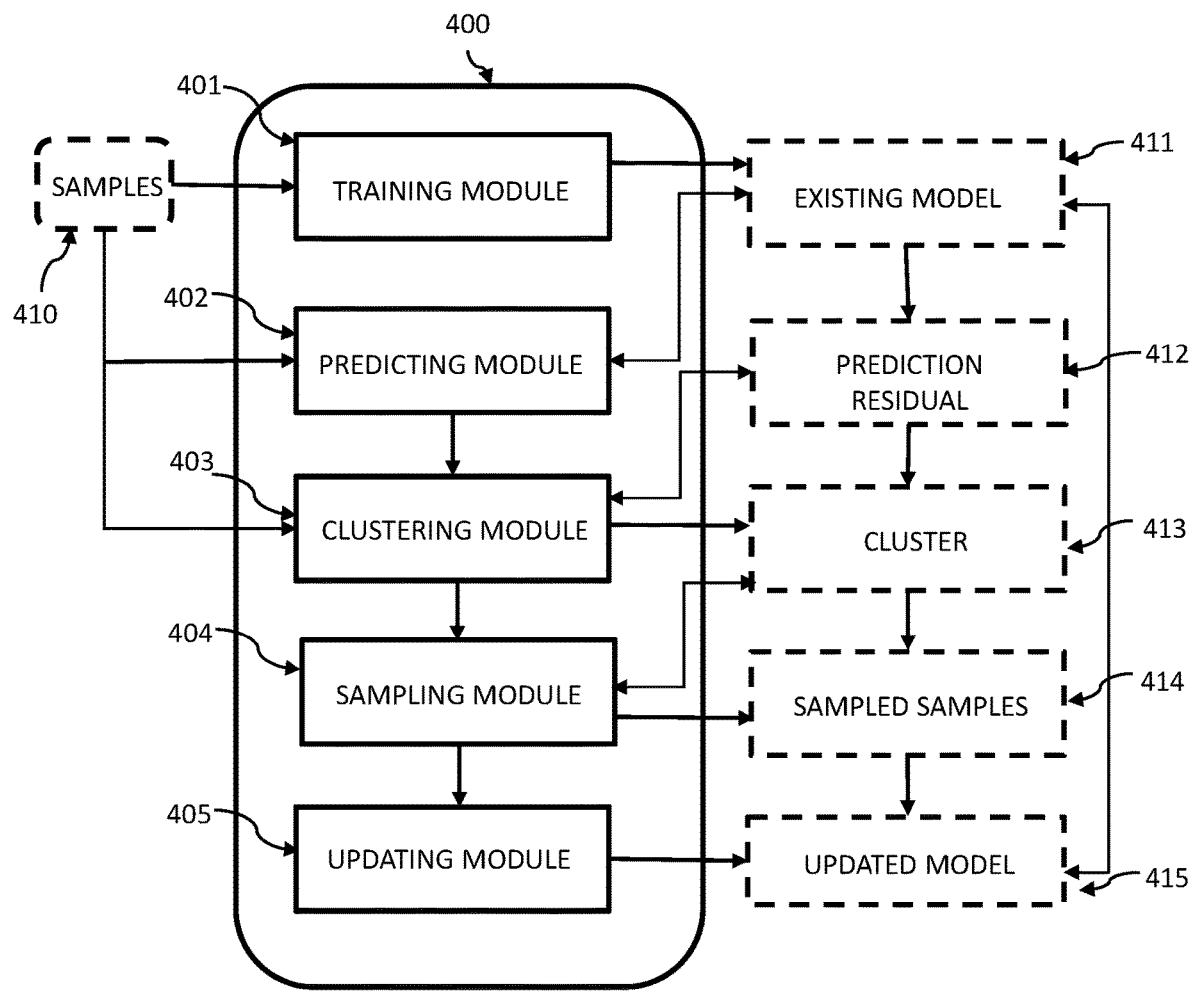
FIG. 4 depicts a diagram illustrating an example system for incremental machine learning for a parametric machine learning model according to some embodiments of the present disclosure.

With reference now to FIG. 4, a diagram illustrating an example system 400 for incremental machine learning for a parametric machine learning model is depicted in accordance with some embodiments. The system 400 may be implemented in a network of data processing systems, such as the network data processing system 100 in FIG. 1, or a cloud computing environment, such as the cloud computing environment in FIG. 3.

The system 400 may comprise a training module 401, a predicting module 402, a clustering module 403, a sampling module 404, and an updating module 405. Referring to FIG. 4, samples 410 may comprise historical samples and new samples. The training module 401 may be configured to produce an existing parametric machine learning model ("existing model", in short) 411 by training the historical samples. After the existing model 411 is produced, the predicting module 402 may be configured to process the samples 410 including the historical samples and the new samples with the produced existing model 411 to obtain at least one prediction residual 412 of each of the samples 410. The clustering module 403 may be configured to cluster the samples 410 based on the at least one prediction residual 412 of each of the samples 410 and respective features of each of the samples 410 to obtain clusters 413. The sampling module 404 may be configured to sample the samples in each cluster 413 to obtain sampled samples 414 to ensure that each cluster includes substantially similar number of sampled samples. The updating module 405 may be configured to update the existing model 411 to obtain an updated parametric machine learning model ("updated model", in short) 415 based on sampled samples 414 in each cluster.

In some embodiments, the training module 401 and the predicting module 402 may use any existing supervised learning technologies. The existing model 411 may be, but not limited to, one of the following models: a linear regression model, a generalized linear model, a logistic regression model, a linear discriminant analysis model, a perceptron model, a naive Bayes model, a deep learning model, and the like.

In some embodiments, Table 3 shows example clusters for the samples 410, in which the output variable is the categorical variable. In Table 3, each row is a record of a sample. A column "ID" represents an identification of a sample. Each of columns "X1", "X2", . . . , "Xn" represents a feature of the sample. A column "R_A" represents a prediction residual of the sample for a category "A". A column "R_B" represents a prediction residual of the sample for a category "B". A column "Cluster_ID" represents which cluster the sample belongs to. The prediction residual set of a sample, i.e. R_A and R_B, may reflect whether the sample can be predicted by the existing model accurately. Thus, the prediction residual set can be added to the set of input features of the sample for clustering. The clustering module 403 may cluster the samples in Table 3, each sample including the set of input features {X1, X2, . . . , Xn, R_A, R_B}, and obtain clusters of the samples. The cluster ID of each sample in Table 3 is in the column "Cluster_ID". Those skilled in the art my understand that the clustering module 403 may use any existing cluster methods, such as k-mean clustering, TwoStep clustering, or density-based special clustering of applications with noise (DBSCAN) or any future developed clustering methods.

TABLE 3

| ID | X1 | X2 | ... | Xn | R_A | R_B | Cluster_ID |
|---|---|---|---|---|---|---|---|
| 1 | 0.3 | 0.7 | ... | 0.2 | 0.15 | −0.15 | 1 |
| 2 | 0.5 | 0.2 | ... | 0.6 | 0.65 | −0.65 | 1 |
| 3 | 0.4 | 0.3 | | 0.5 | −0.35 | 0.35 | 2 |
| 4 | 0.2 | 0.6 | | 0.7 | −0.45 | 0.45 | 2 |
| 5 | 0.8 | 0.4 | | 0.6 | 0.15 | −0.15 | 1 |
| ... | ... | ... | ... | ... | ... | ... | ... |
| N | 0.9 | 0.5 | ... | 0.7 | −0.25 | 0.25 | 2 |

Figure 5:
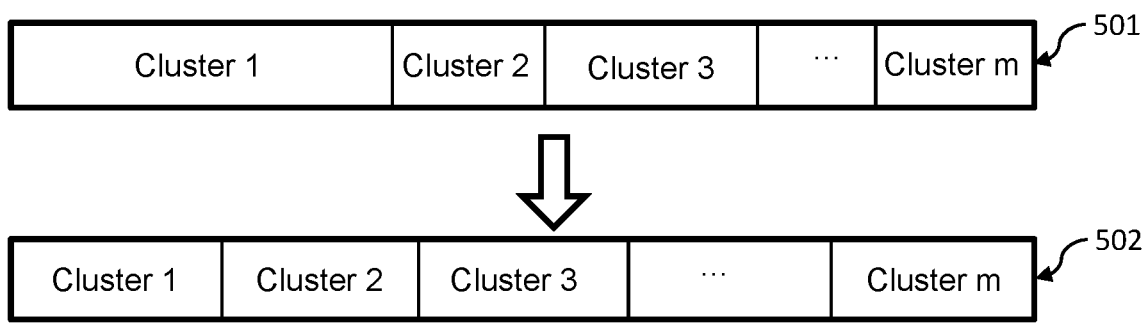
FIG. 5 depicts a schematic diagram of a process implemented by a sampling module according to some embodiments of the present disclosure.

In some embodiments, FIG. 5 depicts a schematic diagram of a process implemented by the sampling module 404 according to some embodiments of the present disclosure. As shown in FIG. 5, clusters 501 including m clusters (m is an integer greater than or equal to 2) are obtained by the clustering module 403. The different size of each cluster in the clusters 501 may indicate each cluster includes a different number of samples. The sampling module 404 may sample samples in each cluster of the clusters 501 to obtains clusters 502 in which each cluster includes substantially similar number of sampled samples. The user may define what the substantially similar number of sampled samples means. For example, if the difference in the number of samples in two clusters is within 5% of the number of samples in one cluster, it is considered that the number of samples in the two clusters is substantially similar. It can be understood that the above 5% is intended to be illustrative, a user may define any other percent or data. The sampling module 404 may use any existing re-sampling method, such as stratified sampling, over sampling, under sampling method, synthetic minority over-sampling technique (SMOTE) or any future developed re-sampling methods, to balance data size in each cluster so that the size of each cluster is almost equal. Suppose that cluster 3 includes 28 samples, which is the minimum number of samples in each cluster of the clusters 501, while cluster 1 includes 900 samples, which is the maximum number of samples in each cluster of the clusters 501. It is obvious that original cluster 1 in the clusters 501 includes a large number of the historical samples, which may be dominant in the existing model 411. After being re-sampled by the sampling module 404, each cluster in the clusters 502 may include nearly 28 samples. New cluster 1 in the clusters 502 also includes nearly 28 samples, a plurality of the history samples in the original cluster 1 is dropped by the sampling module 404. The data pattern in the clusters 502 is more balanced considering the new samples.

Figure 6:
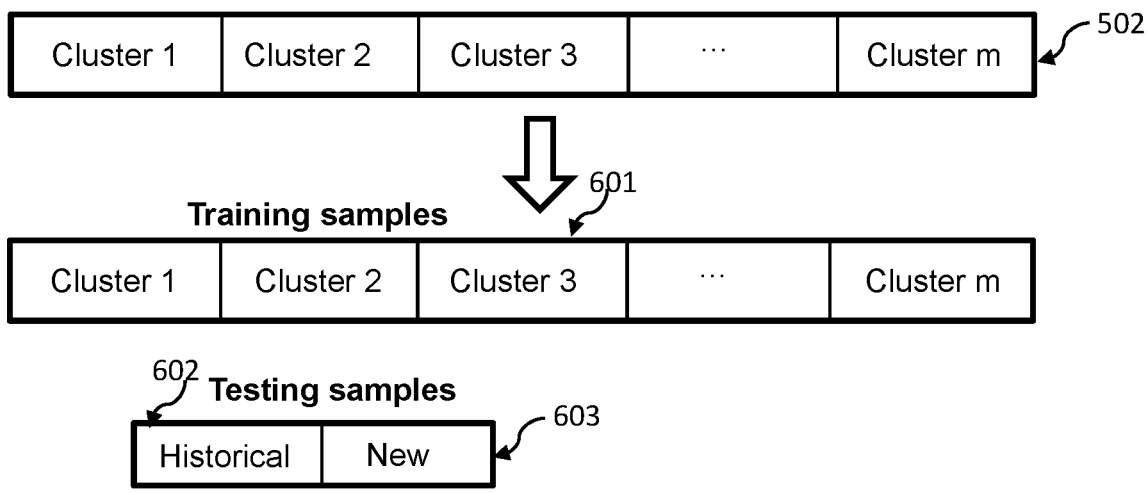
FIG. 6 depicts a schematic diagram of a process implemented by an updating module according to some embodiments of this disclosure.

In some embodiments, FIG. 6 depicts a schematic diagram of a process implemented by the updating module 405 according to some embodiments of this disclosure. As shown in FIG. 6, the clusters 502 are obtained by the clustering module 403, and each cluster in the clusters 502 includes substantially similar number of sampled samples. The updating module 405 may split the sampled samples 502 into training sampled samples 601, historical testing sampled samples 602 and new testing sampled samples 603. The split can be implemented in any existing methods. For example, a user may assign that 80% of the sampled samples in the clusters 502 is the training sampled samples 601, 20% of the sampled samples in the clusters 502 is the testing sampled samples. Then the testing sampled samples may be divided into the historical testing sampled samples 602 and the new testing sampled samples 603 based on an attribute (i.e. the column "New Samples?" in Table 1) of each of the testing sampled samples. The updating module 405 may update the existing model 411 to obtain a temporary parametric machine learning model (temporary model in short) with the training sampled samples 601. Specifically, during updating the existing model 411, the original parameters, such as weights, in the existing model 411, may be used as initial parameters, and the structure of the existing model 411 may be kept unchanged. The updating module 405 may iteratively train the existing model 411 by updating the weights with the training sampled samples 601 until an acceptable level of prediction accuracy for the training sampled samples 601 is achieved. After training, the existing model 411 has been trained to be the temporary model.

In some embodiments, the updating module 405 may then evaluate the temporary model with the historical testing sampled samples 602 and the new testing sampled samples 603. Specifically, during evaluating the temporary model, features (i.e. input vector) of each of the historical testing sampled samples 602 and the new testing sampled samples 603 are input into the temporary model. Then a prediction value for each sample is output by the temporary model. The prediction accuracies for the historical testing sampled samples 602 and the new testing sampled samples 603 may be computed. If the prediction accuracy for the historical testing sampled samples 602 with the temporary model is not higher than a predefined threshold, or the prediction accuracy for the new testing sampled samples 603 with the temporary model is not higher than a prediction accuracy for the new testing sampled samples with the existing model, the updating module 405 may then determine that more new samples are needed for updating the existing model 411 to obtain an updated model. In other words, the updating module 405 may stop and suggest the user that more new samples may be needed to update the existing model.

In the following, the historical testing sampled samples 602 are taken as an example of a set of samples to compute prediction accuracy for the set of samples. If the output variable is the categorical variable, the prediction accuracies for the historical testing sampled samples 602 with a model can be computed as a percentage of correctly classified samples in the historical testing sampled samples 602, and the predefined threshold can be set as a percentage, such as 80%. If the output variable is the continuous variable, the prediction accuracies for the historical testing sampled samples 602 with a model can be computed as a negative average of absolute difference between the predicted values and the values of the output variable of samples in the historical sample, and the predefined threshold can be set as a value, such as −1.8. The predefined thresholds may be defined by a user based on the user's requirements.

However, in some embodiments, if it is determined that the prediction accuracy for the historical testing sampled samples with the temporary model is higher than the predefined threshold and the prediction accuracy for the new testing sampled samples with the temporary model is higher than the prediction accuracy for the new testing sampled samples with the existing model 411, the updating module 405 may determine that a first incremental learning process can be implemented. In other words, a better model (i.e. the temporary model) has been founded, which may be trained further.

Figure 7:
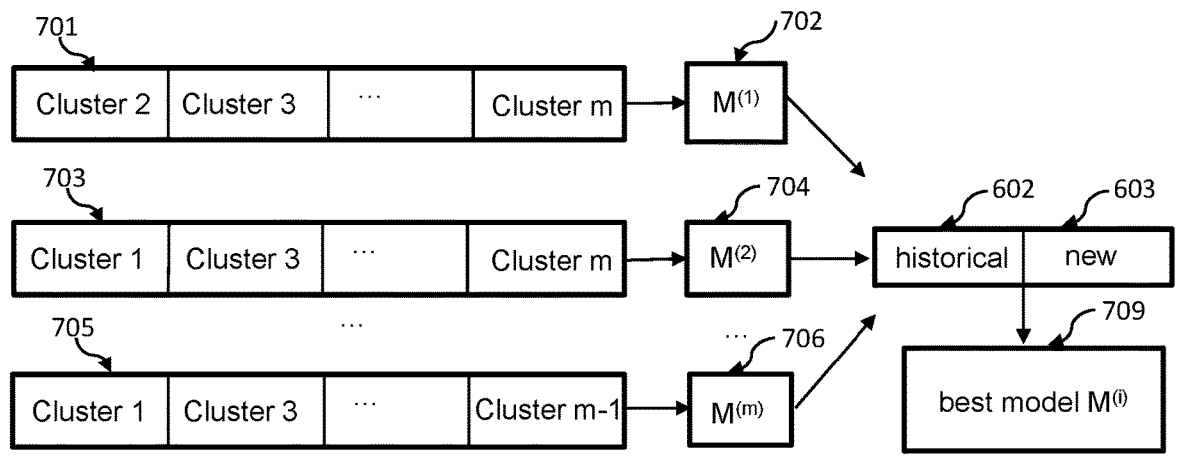
FIG. 7 depicts a first incremental learning process according to some embodiments of this disclosure.

In some embodiments, FIG. 7 depicts the first incremental learning process according to some embodiments of this disclosure. Referring to FIG. 7, training samples 701, training samples 703, . . . , training samples 705 are used to indicate the training sampled samples 601 except for training sampled samples in the cluster 1, in the cluster 2, . . . , in the cluster m, respectively. The updating module 405 may train the temporary model to obtain a cluster-based parametric machine learning model ("cluster-based model", in short) $M^{(1)}$ 702 with the training samples 701. Similarly, the updating module 405 may train the temporary model to obtain a cluster-based model $M^{(2)}$ 704 with the training samples 703, . . . , and train the temporary model to obtain a cluster-based model $M^{(m)}$ 706 with the training samples 705. Steps of updating a model have been described before and are omitted here. Then the updating module 405 may evaluate the cluster-based models $M^{(1)}$ 702, $M^{(2)}$ 704, . . . , $M^{(m)}$ 706 respectively with the historical testing sampled samples 602 and the new testing sampled samples 603. Steps of evaluating a model have been described before and are omitted here. From obtained m models $M^{(1)}$ 702, $M^{(2)}$ 704, . . . , $M^{(m)}$ 706, the updating module 405 may then select cluster-based models whose prediction accuracy for the historical testing samples is higher than the predefined threshold. Suppose that p (p≤m) cluster-based models are selected. The updating module 405 may then select, from the selected p cluster-based models, a specific cluster-based parametric machine learning model ("specific cluster-based model", in short), with the highest prediction accuracy for the new testing samples within the selected p cluster-based models. It is assumed that model $M^{(1)}$ 702 is selected as the specific cluster-based model. If it is determined that the prediction accuracy for the new testing sampled samples 603 with the specific cluster-based model $M^{(1)}$ 702 is not higher than the prediction accuracy for the new testing sampled samples with the temporary model, the updating module 405 may then determine the temporary model as the updated parametric machine learning model.

In some embodiments, if it is determined that a prediction accuracy for the new testing sampled samples 603 with the specific cluster-based model $M^{(1)}$ 702 is higher than a prediction accuracy for the new testing sampled samples 603 with the temporary model, the updating module 405 may then execute a second incremental learning to train the specific cluster-based model $M^{(1)}$ 702 corresponding to a first cluster (i.e., cluster 1) being excluded in updating the specific cluster-based model.

Figure 8:
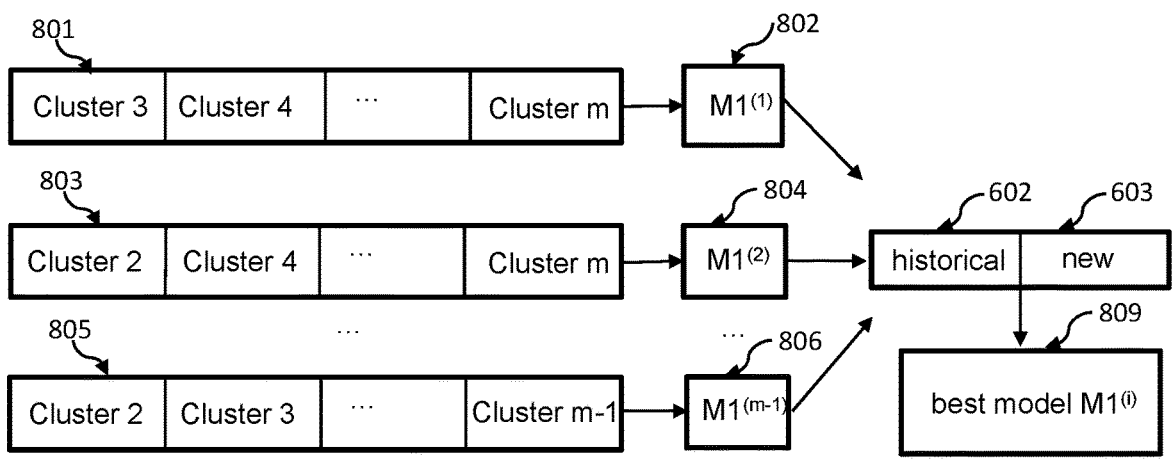
FIG. 8 depicts a second incremental learning process according to some embodiments of this disclosure.

In some embodiments, FIG. 8 depicts the second incremental learning process according to some embodiments of this disclosure. Referring to FIG. 8, training samples 801, training samples 803, . . . , training samples 805 are used to indicate the training sampled samples 601 except for training sampled samples in the first cluster (being excluded during generating the specific cluster-based model), and also except for training sampled samples in the cluster 2, in the cluster 3, . . . , in the cluster m respectively. The updating module 405 may train the specific cluster-based model to obtain a next cluster-based parametric machine learning model (next cluster-based model in short) $M1^{(1)}$ 802 with the training sampled samples 801. Similarly, the updating module 405 may train the specific cluster-based model to obtain a next cluster-based model $M1^{(2)}$ 804 with the training sampled samples 803, . . . , and train the specific cluster-based model to obtain a next cluster-based model $M^{(m-1)}$ 806 with the training sampled samples 805. Steps of updating a model have been described before and are omitted here. Then the updating module 405 may evaluate the next cluster-based models $M1^{(1)}$ 802, $M1^{(2)}$ 804, . . . , $M1^{(m-1)}$ 806 respectively with the historical testing sampled samples 602 and the new testing sampled samples 603. Steps of evaluating a model have been described before and are omitted here. From obtained m models $M1^{(1)}$ 802, $M1^{(2)}$ 804, . . . , $M1^{(m-1)}$ 806, the updating module 405 may then select next cluster-based models whose prediction accuracy for the historical testing samples is higher than the predefined threshold. Suppose that q (q≤m−1) next cluster-based models are selected. The updating module 405 may then select, from the selected q next cluster-based models, a specific next cluster-based parametric machine learning model ("specific next cluster-based model", in short), with the highest prediction accuracy for the new testing sampled samples 603 within the selected q next cluster-based models. It is assumed that model $M1^{(m-1)}$ 806 is selected as the specific next cluster-based model. If it is determined that a prediction accuracy for the new testing sampled samples 603 with the specific next cluster-based model $M1^{(m-1)}$ 806 is not higher than the prediction accuracy for the new testing sampled samples 603 with the specific cluster-based model $M^{(1)}$ 702, the updating module 405 may then determine the specific cluster-based model $M^{(1)}$ 702 as the updated model.

In some embodiments, if it is determined that a prediction accuracy for the new testing sampled samples 603 with the specific next cluster-based model $M1^{(m-1)}$ 806 is higher than a prediction accuracy for the new testing sampled samples 603 with the specific temporary model $M^{(1)}$ 702, the updating module 405 may then iteratively execute a next incremental learning similar to FIG. 8 by further exclude the second cluster, a third cluster, . . . and so on until a prediction accuracy for the new testing sampled samples 603 with a next selected model is not higher than an existing selected model. The updating module 405 may then determine the selected model in the last iteration as the updated model.

Figure 9:
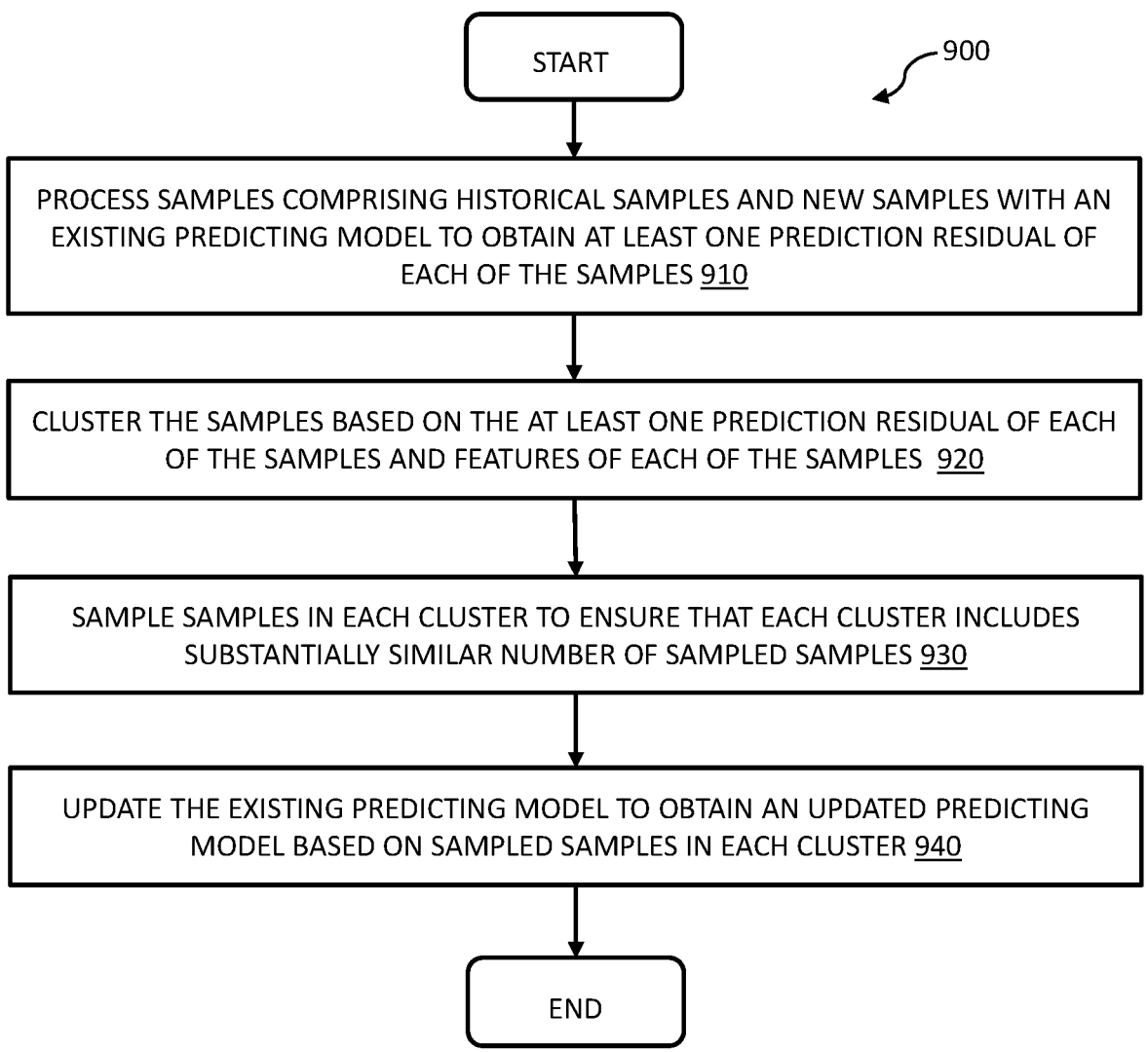
FIG. 9 depicts a flowchart of an exemplary method for incremental machine learning for a parametric machine learning model according to some embodiments of the present disclosure.

FIG. 9 depicts a flowchart of an exemplary method 900 for incremental machine learning for a parametric machine learning model according to some embodiments of the present disclosure. The method 900 may be implemented by the system 400, or other suitable computer/computing systems. For ease of understanding, the method 900 will be described with reference to FIG. 4.

At 910, the system 400 may process the samples 410 comprising historical samples and new samples with an existing parametric machine learning model 411 to obtain at least one prediction residual 412 of each of the samples, where the existing parametric machine learning model 411 was trained based on the historical samples. In some embodiments, the prediction residual 412 of a sample is obtained by one of the following: subtracting a prediction value of the sample predicted by the existing parametric machine learning model from a value of an output variable of the sample if the output variable is a continuous variable; or subtracting a prediction probability value of the sample for the category predicted by the existing parametric machine learning model from a one-hot-encode value of the sample for the category if the output variable is a category variable and the category variable being defined as the one-hot-encode value of the sample for the category.

At 920, the system 400 may cluster the samples 410 based on the at least one prediction residuals 412 of each of the samples and features of each of the samples 410.

At 930, the system 400 may sample samples in each cluster to ensure that each cluster includes substantially similar number of sampled samples 414.

At 940, the system 400 may update the existing parametric machine learning model 411 to obtain an updated parametric machine learning model 415 based on sampled samples.

In some embodiments, the system 400 may split the sampled samples 414 into training sampled samples, historical testing sampled samples and new testing sampled samples. Then the system 400 may train the existing parametric machine learning model 411 to obtain a temporary parametric machine learning model with the training sampled samples. The system 400 may then evaluate the temporary parametric machine learning model with the samples 603 and 604. If a prediction accuracy for the historical testing sampled samples with the temporary parametric machine learning model is not higher than a predefined threshold or a prediction accuracy for the new testing sampled samples with the temporary parametric machine learning model is not higher than a prediction accuracy for the new testing sampled samples with the existing parametric machine learning model, the system 400 may determine that more new samples are needed for updating the existing parametric machine learning model to obtain an updated parametric machine learning mode.

In some embodiments, if the prediction accuracy for the historical testing sampled samples with the temporary parametric machine learning model is higher than the predefined threshold and the prediction accuracy for the new testing sampled samples with the temporary parametric machine learning model is higher than the prediction accuracy for the new testing sampled samples with the existing parametric machine learning model, the system 400 may execute a first incremental learning process.

In some embodiments, in the first incremental learning process, for each specific cluster in all clusters, the system 400 may train the temporary parametric machine learning model to obtain a cluster-based parametric machine learning model with the training sampled samples in all clusters except for those in the specific cluster, and then evaluate the cluster-based parametric machine learning model with historical testing sampled samples and new testing sampled samples respectively. Then the system 400 may select, from all cluster-based parametric machine learning models, cluster-based parametric machine learning models whose prediction accuracy for the historical testing sampled samples is higher than a predefined threshold. The system 400 may then select from the selected cluster-based parametric machine learning models, a specific cluster-based parametric machine learning model with the highest prediction accuracy for the new testing sampled samples within the selected cluster-based parametric machine learning models. If a prediction accuracy for the new testing sampled samples with the specific cluster-based parametric machine learning model is not higher than a prediction accuracy for the new testing sampled samples with the temporary parametric machine learning model, the system 400 may determine the temporary parametric machine learning model as the updated parametric machine learning model.

In some embodiments, if the prediction accuracy for the new testing sampled samples with the specific cluster-based parametric machine learning model is higher than the prediction accuracy for the new testing sampled samples with the temporary parametric machine learning model, the system 400 may execute a second incremental learning process.

In some embodiments, in the second incremental learning process, for each specific cluster in all clusters except for a first cluster which is excluded in updating the specific cluster-based parametric machine learning model, the system 400 may train the specific cluster-based parametric machine learning model with the training sampled samples in all clusters except for those in both the cluster and the first cluster to obtain a next cluster-based parametric machine learning model, and evaluate the next cluster-based parametric machine learning model with the historical testing sampled samples and the new testing sampled samples respectively. Then the system 400 may select, from all next cluster-based parametric machine learning models, next cluster-based parametric machine learning models whose prediction accuracy for the historical testing sampled samples is higher than the predefined threshold. The system 400 may then select, from the selected next cluster-based parametric machine learning models, a specific next cluster-based parametric machine learning model with the highest prediction accuracy for the new testing sampled samples within the selected next cluster-based parametric machine learning models. Again, if a prediction accuracy for the new testing sampled samples with the specific next cluster-based parametric machine learning model is not higher than a prediction accuracy for the new testing sampled samples with the specific cluster-based parametric machine learning model, the system 400 may determine the specific cluster-based parametric machine learning model as the updated parametric machine learning model.

In some embodiments, if it is determined that a prediction accuracy for the new testing sampled samples 603 with the specific next cluster-based parametric machine learning model is higher than a prediction accuracy for the new testing sampled samples 603 with the specific cluster-based parametric machine learning model, the system 400 may then iteratively execute a next incremental learning by further exclude the second cluster, a third cluster, . . . and so on until a prediction accuracy for the new testing sampled samples 603 with a next selected model is not higher than an existing selected model. The system 400 may then determine the selected model in the last iteration as the updated parametric machine learning model.

In some embodiments, the clustering step 920 is implemented using one of following methods: K-mean clustering, TwoStep clustering, or DBSCAN and the like.

In some embodiments, the sampling step 930 is implemented using one of following method: stratified sampling, over sampling, or under sampling.

The samples of the present disclosure may be industrial measurement data, image data, video data, big data collected on the Internet, commercial data, and the like, and the features of the samples may be those commonly used in data processing for those data.

In this way, the updated parametric machine learning model 415 is obtained which may achieve a good prediction accuracy for new samples while keeping an acceptable level of prediction accuracy for the historical samples.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
processing samples comprising historical samples and new samples with an existing parametric machine learning model to obtain at least one prediction residual of each of the samples, wherein the existing parametric machine learning model was trained based on the historical samples;
clustering the samples based on the at least one prediction residual of each of the samples and features of each of the samples;
sampling samples in each cluster to ensure that each cluster includes substantially similar number of sampled samples; and
updating the existing parametric machine learning model to obtain an updated parametric machine learning model based on sampled samples in each cluster, wherein the updating comprises:
training, for each specific cluster in all clusters, a temporary parametric machine learning model with the training sampled samples in all clusters except for those in the specific cluster to obtain a cluster-based parametric machine learning model;
evaluating, for each specific cluster in all clusters, the cluster-based parametric machine learning model with historical testing sampled samples and new testing sampled samples, respectively;
selecting from all cluster-based parametric machine learning models, cluster-based parametric machine learning models whose prediction accuracy for historical testing sampled samples is higher than a predefined threshold; and
selecting from the selected cluster-based parametric machine learning models, a specific cluster-based parametric machine learning model with the highest prediction accuracy for the new testing sampled samples within the selected cluster-based parametric machine learning models.

2. The method of claim 1, wherein the updating the existing parametric machine learning model to obtain an updated parametric machine learning model based on sampled samples in each cluster further comprises:
splitting the sampled samples in all clusters into training sampled samples, historical testing sampled samples, and new testing sampled samples;
training the existing parametric machine learning model with the training sampled samples to obtain the temporary parametric machine learning model; and
evaluating the temporary parametric machine learning model with the historical testing sampled samples and new testing sampled samples.

3. The method of claim 2, wherein the evaluating the cluster-based parametric machine learning model is:
in response to the prediction accuracy for the historical testing sampled samples with the temporary parametric machine learning model being higher than the predefined threshold and the prediction accuracy for the new testing sampled samples with the temporary parametric machine learning model being higher than the prediction accuracy for the new testing sampled samples with the existing parametric machine learning model, and wherein the updating the existing parametric machine learning model to obtain an updated parametric machine learning model based on sampled samples in each cluster further comprises:

in response to a prediction accuracy for the new testing sampled samples with the specific cluster-based parametric machine learning model not being higher than a prediction accuracy for the new testing sampled samples with the temporary parametric machine learning model, determining the temporary parametric machine learning model as the updated parametric machine learning model.

4. The method of claim 3, wherein the updating the existing parametric machine learning model to obtain an updated parametric machine learning model based on sampled samples in each cluster further comprises:

in response to the prediction accuracy for the new testing sampled samples with the specific cluster-based parametric machine learning model being higher than the prediction accuracy for the new testing sampled samples with the temporary parametric machine learning model, for each specific cluster in all clusters except for a first cluster which is excluded in updating the specific cluster-based parametric machine learning model,
training the specific cluster-based parametric machine learning model with the training sampled samples in all clusters except for those in both the specific cluster and the first cluster, to obtain a next cluster-based parametric machine learning model; and
evaluating the next cluster-based parametric machine learning model with the historical testing sampled samples and the new testing sampled samples respectively;
selecting from all next cluster-based parametric machine learning models, next cluster-based parametric machine learning models whose prediction accuracy for the historical testing sampled samples is higher than the predefined threshold;
selecting from the selected next cluster-based parametric machine learning models, a specific next cluster-based parametric machine learning model with the highest prediction accuracy for the new testing sampled samples within the selected next cluster-based parametric machine learning models; and
in response to a prediction accuracy for the new testing sampled samples with the specific next cluster-based parametric machine learning model not being higher than a prediction accuracy for the new testing sampled samples with the specific cluster-based parametric machine learning model, determining the specific cluster-based parametric machine learning model as the updated parametric machine learning model.

5. The method of claim 2, wherein the updating the existing parametric machine learning model to obtain an updated parametric machine learning model based on sampled samples in each cluster further comprises:

in response to a prediction accuracy for the historical testing sampled samples with the temporary parametric machine learning model not being higher than the predefined threshold or a prediction accuracy for the new testing sampled samples with the temporary parametric machine learning model not being higher than a prediction accuracy for the new testing sampled samples with the existing parametric machine learning model, determining that more new samples are needed for updating the existing parametric machine learning model to obtain an updated parametric machine learning mode.

6. The method of claim 1, wherein a prediction residual of a sample is obtained by one of the following:
subtracting a prediction value of the sample predicted by the existing parametric machine learning model from a value of an output variable of the sample in response to the output variable being a continuous variable; or
subtracting a prediction probability value of the sample for the category predicted by the existing parametric machine learning model from a one-hot-encode value of the sample for the category in response to the output variable being a category variable and the category variable being defined as the one-hot-encode value of the sample for the category.

7. The method of claim 1, wherein a parametric machine learning model is one of following models: a linear regression model, a generalized linear model, a logistic regression model, a linear discriminant analysis model, a perceptron model, a naive Bayes model, and a deep learning model.

8. The method of claim 1, wherein the clustering is implemented using one of following methods: k-mean clustering, TwoStep clustering, and density-based special clustering of applications with noise (DBSCAN).

9. The method of claim 1, wherein the sampling is implemented using one of following methods: stratified sampling, over sampling, under sampling, and synthetic minority over-sampling technique (SMOTE).

10. A system, comprising:
at least one processing unit; and
a memory coupled to the at least one processing unit and storing instructions thereon, the instructions, when executed by the at least one processing unit, performing actions including:
processing samples comprising historical samples and new samples with an existing parametric machine learning model to obtain at least one prediction residual of each of the samples, wherein the existing parametric machine learning model was trained based on the historical samples;
clustering the samples based on the at least one prediction residual of each of the samples and features of each of the samples;
sampling samples in each cluster to ensure that each cluster includes substantially similar number of sampled samples; and
updating the existing parametric machine learning model to obtain an updated parametric machine learning model based on sampled samples in each cluster, wherein the updating comprises:
training, for each specific cluster in all clusters, a temporary parametric machine learning model with the training sampled samples in all clusters except for those in the specific cluster to obtain a cluster-based parametric machine learning model;
evaluating, for each specific cluster in all clusters, the cluster-based parametric machine learning model with historical testing sampled samples and new testing sampled samples, respectively;
selecting from all cluster-based parametric machine learning models, cluster-based parametric machine learning models whose prediction accuracy for historical testing sampled samples is higher than a predefined threshold; and
selecting from the selected cluster-based parametric machine learning models, a specific cluster-based parametric machine learning model with the highest prediction accuracy for the new testing sampled samples within the selected cluster-based parametric machine learning models.

11. The system of claim 10, wherein the updating the existing parametric machine learning model to obtain an updated parametric machine learning model based on sampled samples in each cluster further comprises:
splitting the sampled samples in all clusters into training sampled samples, historical testing sampled samples, and new testing sampled samples;
training the existing parametric machine learning model with the training sampled samples to obtain the temporary parametric machine learning model; and
evaluating the temporary parametric machine learning model with the historical testing sampled samples and new testing sampled samples.

12. The system of claim 11, wherein the evaluating the cluster-based parametric machine learning model is
in response to the prediction accuracy for the historical testing sampled samples with the temporary parametric machine learning model being higher than the predefined threshold and the prediction accuracy for the new testing sampled samples with the temporary parametric machine learning model being higher than the prediction accuracy for the new testing sampled samples with the existing parametric machine learning model,
and wherein the updating the existing parametric machine learning model to obtain an updated parametric machine learning model based on sampled samples in each cluster further comprises:
in response to a prediction accuracy for the new testing sampled samples with the specific cluster-based parametric machine learning model not being higher than a prediction accuracy for the new testing sampled samples with the temporary parametric machine learning model, determining the temporary parametric machine learning model as the updated parametric machine learning model.

13. The system of claim 12, wherein the updating the existing parametric machine learning model to obtain an updated parametric machine learning model based on sampled samples in each cluster further comprises:
in response to the prediction accuracy for the new testing sampled samples with the specific cluster-based parametric machine learning model being higher than the prediction accuracy for the new testing sampled samples with the temporary parametric machine learning model,
for each specific cluster in all clusters except for a first cluster which is excluded in updating the specific cluster-based parametric machine learning model,
training the specific cluster-based parametric machine learning model with the training sampled samples in all clusters except for those in both the specific cluster and the first cluster, to obtain a next cluster-based parametric machine learning model; and
evaluating the next cluster-based parametric machine learning model with the historical testing sampled samples and the new testing sampled samples respectively;
selecting from all next cluster-based parametric machine learning models, next cluster-based parametric machine learning models whose prediction accuracy for the historical testing sampled samples is higher than the predefined threshold;
selecting from the selected next cluster-based parametric machine learning models, a specific next cluster-based parametric machine learning model with the highest prediction accuracy for the new testing sampled samples within the selected next cluster-based parametric machine learning models; and
in response to a prediction accuracy for the new testing sampled samples with the specific next cluster-based parametric machine learning model not being higher than a prediction accuracy for the new testing sampled samples with the specific cluster-based parametric machine learning model, determining the specific cluster-based parametric machine learning model as the updated parametric machine learning model.

14. The system of claim 11, wherein the updating the existing parametric machine learning model to obtain an updated parametric machine learning model based on sampled samples in each cluster further comprises:
in response to a prediction accuracy for the historical testing sampled samples with the temporary parametric machine learning model not being higher than the predefined threshold or a prediction accuracy for the new testing sampled samples with the temporary parametric machine learning model not being higher than a prediction accuracy for the new testing sampled samples with the existing parametric machine learning model, determining that more new samples are needed for updating the existing parametric machine learning model to obtain an updated parametric machine learning mode.

15. The system of claim 10, wherein a prediction residual of a sample is obtained by one of the following:
subtracting a prediction value of the sample predicted by the existing parametric machine learning model from a value of an output variable of the sample in response to the output variable being a continuous variable; or
subtracting a prediction probability value of the sample for the category predicted by the existing parametric machine learning model from a one-hot-encode value of the sample for the category in response to the output variable being a category variable and the category variable being defined as the one-hot-encode value of the sample for the category.

16. A computer program product, comprising a computer-readable storage medium having program instructions embodied therewith, the program instructions executable by a first component with at least one processing unit in a cloud computing environment to cause the at least one processing unit to perform actions including:
processing samples comprising historical samples and new samples with an existing parametric machine learning model to obtain at least one prediction residual of each of the samples, wherein the existing parametric machine learning model was trained based on the historical samples;
clustering the samples based on the at least one prediction residual of each of the samples and features of each of the samples;
sampling samples in each cluster to ensure that each cluster includes substantially similar number of sampled samples; and
updating the existing parametric machine learning model to obtain an updated parametric machine learning model based on sampled samples in each cluster, wherein the updating comprises:

training, for each specific cluster in all clusters, a temporary parametric machine learning model with the training sampled samples in all clusters except for those in the specific cluster to obtain a cluster-based parametric machine learning model;

evaluating, for each specific cluster in all clusters, the cluster-based parametric machine learning model with historical testing sampled samples and new testing sampled samples, respectively;

selecting from all cluster-based parametric machine learning models, cluster-based parametric machine learning models whose prediction accuracy for historical testing sampled samples is higher than a predefined threshold; and selecting from the selected cluster-based parametric machine learning models, a specific cluster-based parametric machine learning model with the highest prediction accuracy for the new testing sampled samples within the selected cluster-based parametric machine learning models.

17. The computer program product of claim 16, wherein the updating the existing parametric machine learning model to obtain an updated parametric machine learning model based on sampled samples in each cluster further comprises:

splitting the sampled samples in all clusters into training sampled samples, historical testing sampled samples, and new testing sampled samples;

training the existing parametric machine learning model with the training sampled samples to obtain the temporary parametric machine learning model; and evaluating the temporary parametric machine learning model with the historical testing sampled samples and new testing sampled samples.

18. The computer program product of claim 17, wherein the evaluating the cluster-based parametric machine learning model is in response to the prediction accuracy for the historical testing sampled samples with the temporary parametric machine learning model being higher than the predefined threshold and the prediction accuracy for the new testing sampled samples with the temporary parametric machine learning model being higher than the prediction accuracy for the new testing sampled samples with the existing parametric machine learning model, and wherein the updating the existing parametric machine learning model to obtain an updated parametric machine learning model based on sampled samples in each cluster further comprises:

in response to a prediction accuracy for the new testing sampled samples with the specific cluster-based parametric machine learning model not being higher than a prediction accuracy for the new testing sampled samples with the temporary parametric machine learning model, determining the temporary parametric machine learning model as the updated parametric machine learning model.

19. The computer program product of claim 18, wherein the updating the existing parametric machine learning model to obtain an updated parametric machine learning model based on sampled samples in each cluster further comprises:

in response to the prediction accuracy for the new testing sampled samples with the specific cluster-based parametric machine learning model being higher than the prediction accuracy for the new testing sampled samples with the temporary parametric machine learning model, for each specific cluster in all clusters except for a first cluster which is excluded in updating the specific cluster-based parametric machine learning model, training the specific cluster-based parametric machine learning model with the training sampled samples in all clusters except for those in both the specific cluster and the first cluster, to obtain a next cluster-based parametric machine learning model; and evaluating the next cluster-based parametric machine learning model with the historical testing sampled samples and the new testing sampled samples respectively;

selecting from all next cluster-based parametric machine learning models, next cluster-based parametric machine learning models whose prediction accuracy for the historical testing sampled samples is higher than the predefined threshold;

selecting from the selected next cluster-based parametric machine learning models, a specific next cluster-based parametric machine learning model with the highest prediction accuracy for the new testing sampled samples within the selected next cluster-based parametric machine learning models; and in response to a prediction accuracy for the new testing sampled samples with the specific next cluster-based parametric machine learning model not being higher than a prediction accuracy for the new testing sampled samples with the specific cluster-based parametric machine learning model, determining the specific cluster-based parametric machine learning model as the updated parametric machine learning model.

20. The computer program product of claim 17, wherein the updating the existing parametric machine learning model to obtain an updated parametric machine learning model based on sampled samples in each cluster further comprises:

in response to a prediction accuracy for the historical testing sampled samples with the temporary parametric machine learning model not being higher than the predefined threshold or a prediction accuracy for the new testing sampled samples with the temporary parametric machine learning model not being higher than a prediction accuracy for the new testing sampled samples with the existing parametric machine learning model, determining that more new samples are needed for updating the existing parametric machine learning model to obtain an updated parametric machine learning mode.

* * * * *